Oct. 2, 1934.  E. W. DILG  1,975,352
SEALING MEANS FOR PUMPS AND THE LIKE
Original Filed April 21, 1933
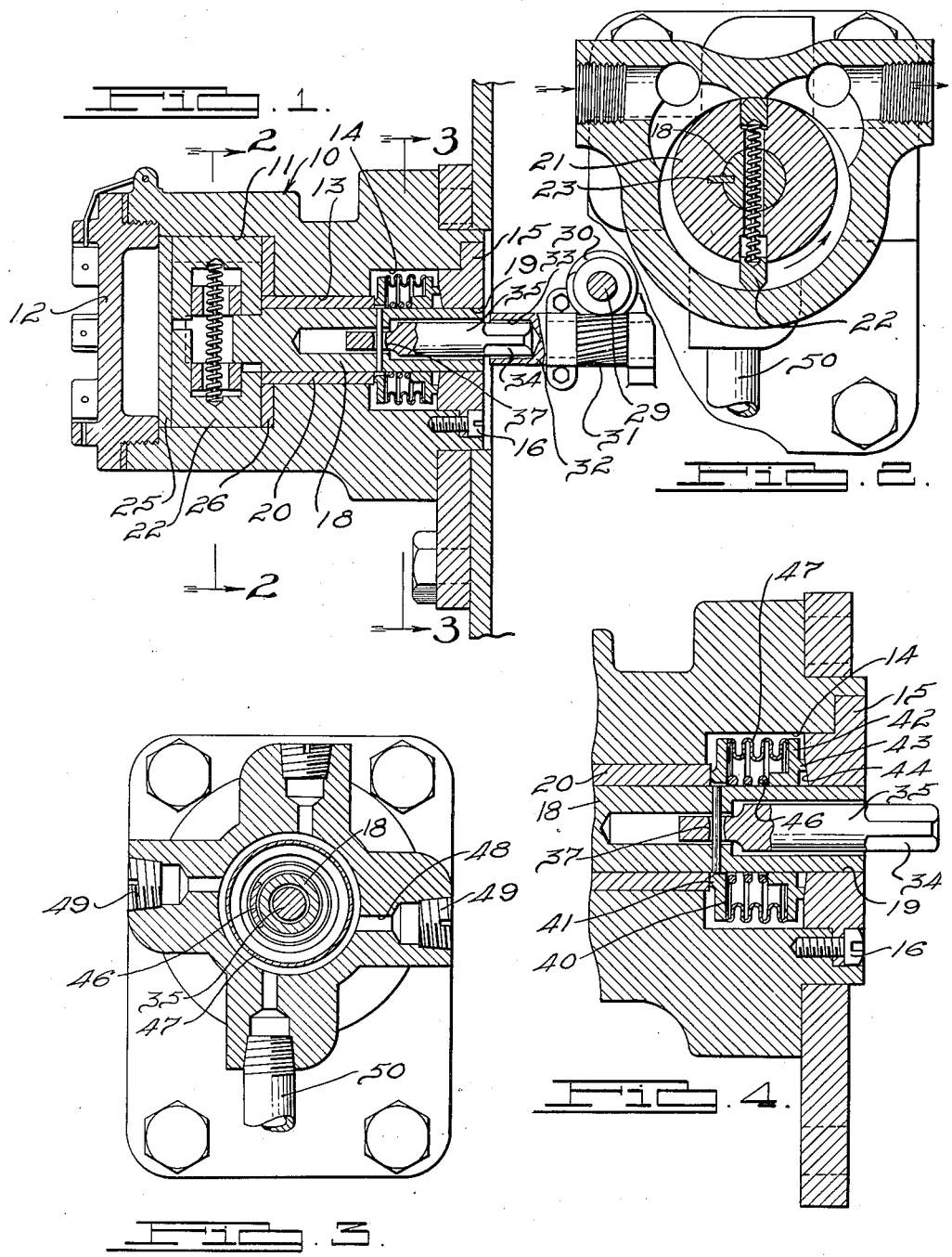
INVENTOR
Earl W. Dilg.
BY
Harness, Dickey, Pierce & Hann
ATTORNEYS.

Patented Oct. 2, 1934

1,975,352

UNITED STATES PATENT OFFICE

1,975,352

SEALING MEANS FOR PUMPS AND THE LIKE

Earl W. Dilg, Detroit, Mich., assignor to Evans Appliance Company, a corporation of Michigan Original application April 21, 1933, Serial No. 667,143. Divided and this application November 10, 1933, Serial No. 697,446

6 Claims. (Cl. 286—11)

The invention relates to shaft sealing means and it has particular relation to shaft sealing means for use in fuel pumps for aircraft.

The invention constitutes a division of copending application for patent, Serial No. 667,143, filed April 21, 1933, and which relates to Pumping mechanism.

While the invention may have a varied application, its particular application in fuel pumps for aircraft is of importance owing to the danger ordinarily attending any leakage of fuel while the aircraft is in flight. Frequently aircraft disasters are caused by a leakage of fuel which becomes ignited. The invention may be applied to fuel pumps in motor vehicles or in other arrangements of pumping mechanism and it also may be applicable generally where shaft sealing is desirable.

One object of the invention is to provide an efficient and improved form of sealing means for more positively preventing the passage of fluid along the shaft periphery.

Another object of the invention is to provide an efficient sealing means of the above mentioned character which will more positively prevent the passage of fuel from a fuel pump chamber along the shaft periphery into a location where it might become ignited.

Another object of the invention is to provide an improved fuel pumping mechanism for aircraft wherein improved sealing means are provided to prevent the escape of fuel along the pump shaft into locations where it might become ignited and further to provide a means for discharging any fuel that might escape past the sealing means, to a point below the fuselage of an airplane, for example, where it cannot be ignited.

Another object of the invention is to provide an improved sealing means for fuel pumps which is constantly effective and efficient for preventing the escape of fuel along the shaft periphery without interfering with the operation of the pump.

Other objects of the invention will become apparent from the following description, the drawing relating thereto and the claims hereinafter set forth.

Referring to the drawing,

Figure 1 is a cross-sectional view of a fuel pump having improved sealing means constructed according to one form of the invention.

Fig. 2 is a cross-sectional view taken substantially along the line 2—2 of Fig. 1.

Fig. 3 is a cross-sectional view taken substantially along the line 3—3 of Fig. 1.

Fig. 4 is a detail view of the sealing means taken on a larger scale so as to illustrate the construction more clearly.

Referring to Fig. 1, the pump illustrated comprises a casing 10 having a cylindrical pump chamber 11 closed at its outer side by means of a screw-threaded cap 12. Intermediate its ends, the casing has an opening of smaller diameter as indicated at 13 and at that side of the opening 13 opposite the chamber 11 a smaller chamber 14 is provided which is closed at its outer end by a removable plug 15 releasably secured to the casing by bolts 16. The pumping mechanism includes a shaft 18 projecting through and journaled in an opening 19 in the plug 15, and which is also journaled in a sleeve bearing 20 tightly fitting in the opening 13, and in the chamber 11, the shaft projects into a rotor 21. The rotor has resiliently pressed and diametrically opposite vanes or blades 22 adapted to engage the periphery of the chamber 11 and in this connection it is to be understood that the axis of the chamber 11 is offset with respect to the axis of the shaft so that its periphery is eccentric with respect to the shaft. The rotor 21 is keyed to the shaft as indicated at 23 but the shaft may slide with respect to the rotor. Wear plates 25 and 26 may be provided at opposite sides of the rotor 21 as usually and particularly in fuel pumps for airplanes it is desirable to construct the casing 10 of light metal and to provide hard metal wear elements at such sides of the rotor.

The shaft 18 is driven by means of a drive shaft 29 drivingly connected to the engine or other suitable source of power, which has a worm 30 meshing with a worm 31 on a sub-shaft 32. A socket 33 on the shaft 32 receives a polygonal end 34 of a second shaft 35 that projects loosely into an opening in the shaft 18 and is universally connected thereto as indicated at 37. In operating the pump, fuel sometimes will escape between the sleeve bearing 20 and the shaft owing to the fact that a certain amount of clearance necessarily must exist, and the invention is particularly adapted to prevent escape of this fuel into dangerous locations.

Referring now particularly to Fig. 4, within the chamber 14 a ring or collar 40 is slidably mounted on the shaft 18 and has a projecting rib 41 having face contact with the end of the bearing 20. A second ring or collar 42 is tightly and rigidly mounted on the shaft adjacent the plug 14 and this collar has a rib 43 provided with a tapered face that engages a tapered face 44 on the inner surface of the plug 15. The collars are urged apart and into engagement respectively with the bearing 20 and the plug 15 by means of a helical spring 46 disposed between the collars. In this respect it will be understood that although the collar 42 is fixed and sealed to the shaft 18, the slidable engagement between the shaft 18 and pump rotor 21 will permit the shaft 18, and consequently the collar 42 to move sufficiently under the influence of the spring 46 to effect the proper sealing engagement between the collar 42 and plug 15. An extensible bellows 47 is provided between the collars and preferably this bellows will be constructed of some material such as flexible metal which will not be affected by hydro-carbon fuel. The ends of this bellows may be secured in any suitable manner to the collars 42 and 40 such as by soldering or welding and it is to be understood that the bellows will be sealingly connected to the collars at each end thereof.

In operation of the pump, in the event fuel escapes between the bearing 20 and the shaft 18, it may flow between the ring or collar 40 and the shaft periphery but the face contact between the rib 41 on this collar and the end of the bearing 20 ordinarily will provide an efficient seal to prevent the fuel from flowing radially and outwardly between the collar and the end of the bearing. Fuel flowing between the collar and the shaft and into the space between the collars cannot escape radially between the latter owing to the bellows and is positively prevented from flowing past the collar 42 owing to the tight and positive engagement of the collar with the shaft surface. In the event fuel should flow at any time between the collar 40 and the end of the bearing 20 and outwardly over the bellows, it will be prevented from flowing between the shaft and the opening in the plug 15 by the sealing engagement between the rib 43 and the tapered surface 44 of the plug. Accordingly, three sealing points are provided to prevent the fuel from flowing outwardly beyond the casing along the shaft surface as the fuel will be stopped by the engagement between the collar 40 and the end of the bearing 20, by the engagement between the collar 42 and the shaft 18 and by the engagement of the rib 43 on the ring or collar 42 with the tapered surface 44 on the plug. This arrangement provides a very positive seal to prevent the escape of fuel particularly to the exterior of the casing where it might ignite or explode.

For further insuring the prevention of fuel escaping to a location where it might become ignited, the casing 10 around the chamber 14 has four openings 48 communicating with the chamber and these openings are so located that, regardless of the position of the fuel pump, one opening may be in such position that it may be used to drain any fuel collecting in the chamber. The other openings are closed by plugs 49 and such lower opening may be connected to a pipe 50 that will project below the fuselage of the airplane so that any fuel collecting in the chamber 14 may drain to a point below any possible danger of ignition.

It will be appreciated from this description that fuel is very positively prevented from escaping and that this sealing means is constantly effective owing to the slidable character of the shaft 18 so that the collar 42 may at all times positively abut the plug 15. Thus throughout the life of the pump, the sealing means is constantly operative and it will be readily appreciated that the surface sealing contacts will normally remain effective for preventing fuel from flowing therebetween. It will also be apparent that even in the event fuel does escape into the chamber 14, it may drain through the lowermost opening 48 and pipe 50 to a point where it will not be subjected to the danger of ignition or explosion. All of these factors contribute to provide a very safe and positive means for preventing the escape and ignition of fuel and this is extremely important particularly in aircraft while in flight.

Although only one form of the invention has been described and illustrated in detail, it will be apparent to those skilled in the art that various modifications may be made without departing from the scope of the appended claims.

I claim:

1. In combination, a casing having opposed side walls provided with shaft openings, a shaft extending through the openings and being slidable axially thereof, a collar tightly and non-slidably mounted on the shaft so that it will rotate with the latter, a second collar slidably mounted on the shaft, axially extensible cover means extending between and sealingly engaging the collars and means between the collars urging them respectively into sealing engagement with said wall portions of the casing.

2. In combination, a casing having opposed side walls provided with shaft openings, a bearing fitting tightly in one of said openings, a shaft slidably projecting through said openings and said bearing, a pair of spaced collars on the shaft, one of said collars tightly and non-slidably fitting on the shaft and the other collar being slidable on the shaft, axially extensible cover means between and sealingly engaging the collars, and resilient means urging the collars into sealing engagement with the bearing and the opposed side wall of the casing.

3. In combination, a casing having a chamber defined by an outer wall, a side wall and a removable plug, apertures in said side wall and plug for receiving a shaft, a sleeve bearing tightly fitting in the opening in the side wall, a slidable shaft journalled in said bearing and opening in the plug, a collar slidable on the shaft and sealingly engaging the end of the bearing, a second collar tightly mounted on the shaft and sealingly engaging the plug, a spring between the collars for urging them against said bearing and plug respectively, and axially extensible cover means covering the space between the collars and being sealingly connected thereto.

4. In combination, a casing having a chamber defined by an outer wall, a side wall and a removable plug, apertures in said side wall and plug for receiving a shaft, a sleeve bearing tightly fitting in the opening in the side wall, a slidable shaft journalled in said bearing and opening in the plug, a collar slidable on the shaft and sealingly engaging the end of the bearing, a second collar tightly mounted on the shaft for sealingly engaging the plug, said second collar and plug having complementary, tapered surfaces engaging each other, a spring between the collars for urging them against said bearing and plug respectively, and axially extensible cover means covering the space between the collars and being sealingly connected thereto.

5. In a pump structure, in combination, a casing, a rotatable drive shaft therein, a pocket formed in said casing about said drive shaft, a ring fixed to said shaft in sealing relation with respect thereto, a second ring surrounding said shaft in spaced relation to the first mentioned ring, spring means constantly urging said rings apart and into engagement with the opposite end walls of said pocket, and extensible means sealing said rings together.

6. In a pump structure, in combination, a casing having a recess in one end thereof and a rotatable drive shaft having bearing in said casing and projecting into said recess, a closure for the open end of said recess providing additional bearing for said shaft, a ring fixed to said shaft within said recess and a second ring slidable on said shaft within said recess, projecting annular ribs on the remote faces of said rings, spring means urging said rings apart and said ribs into engagement with the bottom wall of said recess and said closure respectively, and flexible means sealing the peripheries of said rings together against leakage.

EARL W. DILG.